United States Patent
Norby et al.

[11] Patent Number: 5,933,486
[45] Date of Patent: Aug. 3, 1999

[54] ENHANCED SERVICE CONTROL ARCHITECTURE OF A TELECOMMUNICATIONS SWITCHING NETWORK

[75] Inventors: Steven Eugene Norby, Lenexa, Kans.; Daniel Charles Sbisa, Blue Springs, Mo.

[73] Assignee: Sprint Communications Co. L.P., K.C., Mo.

[21] Appl. No.: 08/842,384

[22] Filed: Apr. 23, 1997

[51] Int. Cl.⁶ ........................................................... H04M 7/00
[52] U.S. Cl. ........................... 379/207; 379/220; 379/229
[58] Field of Search ..................................... 379/201, 207, 379/220, 221, 229, 230

[56] References Cited

U.S. PATENT DOCUMENTS

| | | | |
|---|---|---|---|
| 5,237,604 | 8/1993 | Ryan | 379/220 |
| 5,390,242 | 2/1995 | Bales et al. | 379/221 |
| 5,539,884 | 7/1996 | Robrock, II | 379/15 |
| 5,550,911 | 8/1996 | Bhagat et al. | 379/220 |
| 5,633,922 | 5/1997 | August et al. | 379/220 |
| 5,684,866 | 11/1997 | Florindi et al. | 379/220 |

*Primary Examiner*—Daniel S. Hunter
*Attorney, Agent, or Firm*—Harley R. Ball; Bruce C. McClelland

[57] ABSTRACT

A telecommunications network architecture uses a service host to control the application of enhanced services. In preferred forms, the service host determines the disposition of the call and provides corresponding instructions to the origination switch by way of a service control point (SCP) in response to a request initiated by the SCP upon encountering a service node in the routing tables. The disposition may include routing the call to a media resource and if another call destination is determined, the call is rerouted from the origination switch to the destination while the first routing is dropped.

20 Claims, 1 Drawing Sheet

ENHANCED SERVICE CONTROL ARCHITECTURE OF A TELECOMMUNICATIONS SWITCHING NETWORK

RELATED APPLICATIONS

Not applicable.

FEDERALLY SPONSORED RESEARCH OR DEVELOPMENT

Not applicable.

MICROFICHE APPENDIX

Not applicable.

BACKGROUND OF THE INVENTION

1. Field of the Invention

The present invention relates to the field of telecommunications. In particular, the invention is concerned with a telecommunications network architecture that uses a service host to control the application of enhanced services. In preferred forms, the service host determines the disposition of the call and provides corresponding instructions to the origination switch by way of a service control point (SCP) in response to a request initiated by the SCP upon encountering a service node in the routing tables.

2. Description of the Prior Art

Enhanced service calls are those requiring services beyond direct dialing or translation of a dialed number into a destination number. An example is a call placed using a voice calling card requiring the services of a voice response unit for handling. The origination switch recognizes the dialed number of the voice calling card call, such as a toll free or "800" number, as being a special number and forwards a query to a service control point (SCP). The SCP executes routing tables and thereby translates the dialed number into a destination number corresponding to the voice response unit (VRU). The call is routed over the network to a controllable service switch serving a set of VRUs. The VRU and a connected host computer process the call. If the processing results in a destination number, for example, the call is re-originated from the controllable service switch over a new routing to the destination. For the duration of the call, two routings or call legs are in service: from the origination switch to the controllable service switch and from there to the destination. Additionally, controllable service switch ports are also in use for the entire duration of the call. This represents an inefficient use of network capability.

SUMMARY OF THE INVENTION

The present invention solves the prior art problems discussed above and provides a distinct advance in the state of the art. In particular, the network architecture hereof increases network efficiency by eliminating unnecessary call routings and use of network equipment.

In the preferred embodiment, a call is received into a telecommunications network at an origination site where it is determined whether the call may require enhanced service. If such is the case, the call is routed over the network using a first routing to a service site capable of providing the enhanced service. If it is determined that the call should be routed to a second site, the first call routing is dropped and the call is routed over the network from the origination site to the second site using a second call routing.

In preferred forms, the network includes a service host operable for determining the enhanced service needs of calls. The service host is connected to selected SCPs which are configured to include service nodes in the processing functions. Whenever a service node is encountered during the processing of the called number, the SCP forwards call information to the service host and requests service instructions. In response, the service host determines the disposition of the call, which may include connection to a network resource such as a VRU or connection to another site.

The service host sends service instructions to the SCP which, in turn, sends instructions to the origination switch. If the instructions are for connection to a network resource, the switch routes the call over the network to the network resource, which is also in communication with the service host. Upon completion of call processing by the resource, the routing is dropped from the origination switch to the resource. If the service host determines that routing to a second destination is needed, appropriate instructions are forwarded to the origination switch by way of the SCP to establish a new routing to the second destination. Other preferred aspects of the present invention are discussed herein.

BRIEF DESCRIPTION OF THE DRAWINGS

The single drawing FIGURE is a schematic representation of a telecommunications network embodying the present invention.

DETAILED DESCRIPTION OF THE PREFERRED EMBODIMENT

Figure 1:
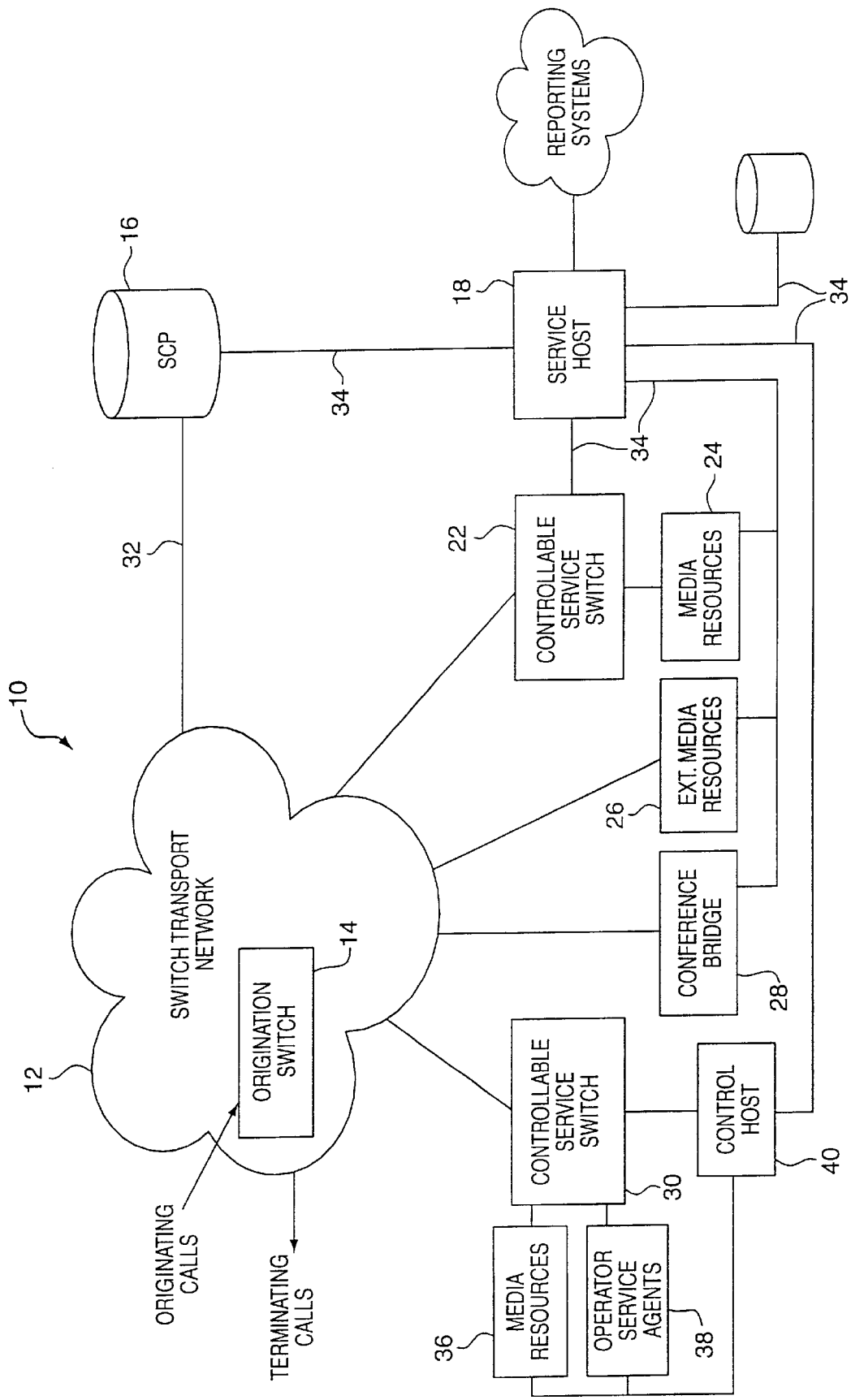

The drawing figure illustrates telecommunications network 10 embodying the present invention. Telecommunications network 10 includes switch transport network 12 including origination switch 14, service control point (SCP) 16, service host 18, and a plurality of dialable sites 20 operable to provide various services. Sites 20 include, for example, a controllable service switch 22 providing access to various media resources 24, external media resources 26, conference bridge 28, and controllable service switch 30.

Switch transport network 12 is conventional in nature for handling telecommunications traffic and could be included as part of an interexchange carrier, a local exchange carrier, or both. Network 12 typically includes a plurality of network switches such as DMS250 switches used for narrowband transport, but could also include other types of switches such as broadband ATM switches for asynchronous transfer mode, or other types of equipment for handling the telecommunications traffic.

In the preferred embodiment, origination switch 14 determines the routing and handling of certain calls such as direct dialed long distance calls. For other types of calls, such as special billing calls (e.g., toll free calls) and calls needing enhanced services, the nature of the dialed number or call origination prompts switch 14 to send a query to SCP 16 over signaling connection 32, typically using signaling system #7 (SS7). A query usually includes the dialed number and calling number, but may also include other available call information. The query received by the SCP is used to request other information concerning disposition of the call.

SCP 16 is conventional in nature and represents a plurality of SCPs for handling the service needs of network 10. SCP 16 operates using standard intelligent network routing operations (allocation percent, time of day, and so forth), also called routing tables, routing statements or routing trees, for determining the disposition of calls on the basis of the dialed number, calling number, and other call information. In the preferred embodiment, the node routing operations are configured to include service nodes. When a service node is encountered, this prompts a request for service instructions over connection 34 to service host 18, or prompts the routing of the call to a designated network resource and then to await further instructions.

Service host 18 is preferably a service session execution control processor and communicates with other network resources using TCP/IP, for example, over appropriate communications connections as represented by connection 34. It will be appreciated that network 10 can include a plurality of hosts 18 as needed to satisfy the enhanced service needs of the network.

In general, host 18 determines the disposition of calls needing enhanced services such as a voice response unit (VRU), operator services and other services beyond direct dialing and translation of a special billing number. That is, host 18 determines what network resource (or resources) is needed for the call and directs origination switch 14 to route the call to the needed network resource. In this connect to-resource process, host 18 directs switch 14 to drop the first routing, that is, release a network resource from a call at the conclusion of the network resource's role and then directs switch 14 to re-originate the call, if needed, over a second routing to another site such as a terminating destination.

In operation, an incoming call is received at origination switch 14. If the dialed number, or other call information, indicates that the call may require enhanced services, switch 14 sends a query over connection 32 to SCP 16, which executes node routing operations. It will be appreciated that other call information may be used to determine the need for enhanced services. This other information may include, for example, the called number, calling number, originating trunk group, originating access facility, originating location, originating service for call type, originating device type, or combinations thereof.

If a service node is encountered calling for interaction with service host 18, SCP 16 assigns a call reference identifier (CRID) and sends a request for service instructions to service host 18. As explained further herein, another type of service node may be encountered that prompts routing to a specified network resource and then to await further instructions.

Host 18 analyzes the call information provided by the SCP, and determines the disposition of the call. In particular, host 18 determines what network resources can provide the needed enhanced service. For example, media resources 24 includes VRUs with selectable scripts and can be accessed from the switch network by way of controllable service switch 22.

Other network resources are also available and host 18 can direct termination at any connectable location. External media resources 26 can provide VRUs without the need for access through a controllable service switch using the present invention. Examples of other media resources include conference bridge 28 for audio balancing of conference calls and controllable service switch 30 for providing access to operator services, agents or media resources under the control of control host 36. Connections 34 provide communication and control between service host 18 and the available network resources.

If host 18 determines that an enhanced service resource is not needed, host 18 responds to SCP 16 with a service instruction to perform the next node routing. This would typically result in translation to a destination number. This number is provided as a response to the query by switch 14, which routes the call to the destination.

If, however, host 18 determines that an enhanced service resource is needed, the identification of the resource is provided as a service instruction to SCP 16. SCP 16 then looks up and provides destination information to origination switch 14 for routing the call to the designated resource trunk group. Switch 14 then attempts to select a specific trunk such as a VRU port in the group. ISDN PRI or inband DTMF or MF is used for VRU port signaling. Switch 14 also passes the CRID and dialed number to the VRU port.

Upon connection to the network resource, switch 14 sends a connect-to-resource acknowledgment to SCP 16. This acknowledgment includes the CRID for mapping to the proper call. SCP 16 also forwards the call information, identification address of the selected resource, and CRID to service host 18.

If the selected resource is a VRU, host 18 also performs service discrimination to determine the specific script to play to the caller, and then locates and communicates with the resource, such as the specific VRU, that was selected by switch 14. Host 18 then instructs the VRU to play the service script to the caller. The VRU then plays the script, collects input from the caller, and returns the script results (or caller data or both) to host 18 for analysis. It should be noted that the caller input could also be "no response" as a default for routing action.

With input from the enhanced service resource, service host 18 determines the next step for the call. This may include further interaction with the selected resource, or routing the call to another site, which could be another resource or a destination number. For example, if the caller is using a voice calling card, further interaction with the same resource could include the speaking of a spoken speed dial number, as prompted by host 18. Interaction with another resource could include connection with a message center. Finally, for the calling card example, the caller could enter a destination telephone number.

If the determination is to route the call to another site, the process is repeated as described above for establishing the first connection. That is, host 18 sends a service instruction to SCP 16 which in turn provides instruction to origination switch 14 representative of the disposition of the call as determined by service host 18. In such a case, the first call routing is dropped and the call is then routed over the network from origination switch 14 to the next site using a second or subsequent call routing.

The routing node operations of SCP 16 can also be configured to include service nodes that prompt the routing to a specified resource, without the need to receive initial instructions from host 18, and then to await further instructions. This is part of the connect-to-resource process. With successful connection to the specified resource, origination switch 14 sends an acknowledgment to SCP 16 as described above with the needed information forwarded to service host 18, which then interacts with the selected resource. This process of connect and wait eliminates an interaction session between SCP 16 and host 18 and reduces the time to connect the caller to a resource.

As illustrated in the drawing figure, host 18 also provides report information to various reporting systems and interacts with those systems. The report information includes alarms, billing, usage and management information. Also as illustrated, calls can be routed to controllable service switch 22 directly controlled by service host 18, which itself may provide enhanced services independent of SCP 16 controlling originating switch 14.

As those skilled in the art will now appreciate, the present invention enables enhanced services to be provided in a particularly efficient manner. Calls are connected to an enhanced service resource only for the time needed for the resource to provide the needed service. Moreover, when the routing to a resource is no longer needed, that routing is dropped and is not maintained in the call connection to the next site. Further, control of enhanced service is provided by the service hosts, but switch transport network connection instructions are provided by way of the SCPs.

We claim:

1. In a telecommunications network operable for handling telecommunications traffic, a method of operating the network comprising the steps of:
   (a) receiving a call into the network at an origination site;
   (b) determining whether said call needs enhanced services an if so, routing the call over the network using a first call routing to a service site having means for providing said enhanced service; said determining step including the steps of
      (1) using call information to determine whether said call needs enhanced service, said call information being selected from the group consisting of the dialed number, called number, calling number, originating trunk group, originating access facility, originating location, originating service for call type, and originating device type;
      (2) sending a query for routing instructions from said origination switch to a service control point (SCP);
      (3) processing said call information through routing tables having service nodes and if a service node is encountered, sending a request for service instructions from said SCP to an enhanced service host; and
   (c) providing said enhanced service and in response, determining whether the call should be routed to a second site and if so, dropping said first call routing and routing the call over the network from said origination site to said second site using a second call routing.

2. The method as set forth in claim 1, step (a) including the step of receiving said call at origination switch.

3. The method as set forth in claim 1, step (a) including the step of receiving said call into a narrowband switch network.

4. The method as set forth in claim 1, step (a) including the step of receiving said call into a broadband switch network.

5. The method as set forth in claim 1, step (b) further including the steps of
   determining the disposition of said call in said enhanced service host in response to said request and sending service instructions representative of said disposition to said SCP,
   in said SCP, responding to said service instructions by sending an answer to said query representative of said disposition to said origination switch, and
   in said origination switch, responding to said answer by processing said call in accordance therewith.

6. The method as set forth in claim 5, said disposition including the determination of a resource for providing said enhanced service, step (b) including the step of routing the call to said resource as said service site.

7. The method as set forth in claim 6, step (c) including the step of determining in said enhanced service host whether said call should be routed to said second site.

8. The method as set forth in claim 7, step (c) including the step of routing said call to another resource as said second site.

9. The method as set forth in claim 7, step (c) including the step of routing said call to a destination telephone number as said second site.

10. The method as set forth in claim 7, step (c) including the step of controlling the provision of said enhanced service in said resource by using said enhanced service host.

11. The method as set forth in claim 1 including the step of repeating steps (b) and (c) for additional destination sites.

12. The method as set forth in claim 1, step (e) including the step of processing said call information through routing tables having service nodes and if a service node is encountered, routing the call to said service site.

13. In a telecommunications network operable for handling telecommunications traffic, a method of operating the network comprising the steps of:
   (a) receiving a call and call information concerning the call into the network at an origination switch;
   (b) determining whether said call information indicates the need for enhanced service for the call if so, sending a query including said call information to a service control point (SCP);
   (c) in said SCP, processing said call information through routing tables having service nodes;
   (d) if a service node is encountered during said processing, sending a request for service instructions from said SCP to an enhanced service host;
   (e) in said enhanced service host, processing said request and determining routing for said call to a network resource for providing said enhanced service and, in response, sending instructions representative of said routing to said SCP;
   (f) in said SCP, responding to said instructions by sending an answer to said query representative of said routing to said origination switch; and
   (g) in said origination switch, responding to said answer by routing said call to said network resource.

14. The method as set forth in claim 13, step (g) further including the step of controlling the provision of said enhanced service by said resource using said enhanced service host.

15. The method as set forth in claim 14 further including the step of upon completion of said enhanced service by said resource, dropping the routing from said origination switch to said resource.

16. The method as set forth in 15 further including the step of determining in said enhanced service host whether said call should be routed to a second site and if so, routing said call from said origination switch to said second site.

17. The method as set forth in claim 16 further including the step of routing said call to another resource as said second site.

18. The method as set forth in claim 16 further including the step of routing said call to a destination telephone number as said second site.

19. The method as set forth in claim 13, steps (a), (b) and (c) including the steps of using said call information selected from the group consisting of the dialed number, called number, calling number, originating trunk group, originating access facility, originating location, originating service for call type, and originating device type.

20. The method as set forth in claim 13, step (d) including the step of assigning a call reference identifier to the call in said SCP and sending said call reference identifier and at least a portion of said call information to said enhanced service host.

* * * * *